(12) United States Patent
Kang et al.

(10) Patent No.: US 9,230,051 B2
(45) Date of Patent: Jan. 5, 2016

(54) METHOD OF GENERATING VOLTAGE ISLAND FOR 3D MANY-CORE CHIP MULTIPROCESSOR

(71) Applicant: Industry-Academic Cooperation Foundation, Yonsei University, Seoul (KR)

(72) Inventors: Sungho Kang, Seoul (KR); Hyejeong Hong, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/579,023

(22) Filed: Dec. 22, 2014

(65) Prior Publication Data

US 2015/0193571 A1 Jul. 9, 2015

(30) Foreign Application Priority Data

Jan. 3, 2014 (KR) ........................ 10-2014-0000571

(51) Int. Cl.
*G06F 1/26* (2006.01)
*G06F 17/50* (2006.01)
(Continued)

(52) U.S. Cl.
CPC .......... *G06F 17/5072* (2013.01); *G06F 1/3234* (2013.01); *G06F 1/3296* (2013.01); *G06F 17/505* (2013.01); *G06F 2217/68* (2013.01); *G06F 2217/78* (2013.01); *G06F 2217/80* (2013.01)

(58) Field of Classification Search
CPC ... G06F 1/3234; G06F 1/3296; G06F 17/505; G06F 17/5072; G06F 2217/80; G06F 2217/78; G06F 2217/68; G06F 2217/08; H01L 25/00; G03K 19/00392

USPC .......... 713/1, 2, 300, 310, 320; 716/104, 123; 718/102; 257/494, 686, 773, 777, 257/E23.08, E23.011; 326/10; 327/291, 327/538, 565; 345/522; 361/679.53; 438/118

See application file for complete search history.

(56) References Cited

U.S. PATENT DOCUMENTS 7,234,124 B2 6/2007 Chen et al.
7,487,012 B2 2/2009 Bose et al.
(Continued)

FOREIGN PATENT DOCUMENTS

JP 2006261581 A 9/2006
KR 20020037715 A 5/2002
(Continued)

OTHER PUBLICATIONS

Majzoub et al., "Energy optimization for many-core platforms: Communication and PVT aware voltage-island formation and voltage selection algorithm", IEEE Transactions of Computer-Aided Design of Integrated Circuits and Systems, vol. 29, No. 5, pp. 1-14, May 2010.
(Continued)

*Primary Examiner* — Dao H Nguyen
(74) *Attorney, Agent, or Firm* — Carter, DeLuca, Farrell & Schmidt, LLP

(57) ABSTRACT

Provided is a method of forming a voltage island for a 3D many-core chip multiprocessor, the method including setting the priority of a voltage zone based on the heat emission characteristic of the voltage zone; and forming a voltage island by using the priority.

11 Claims, 5 Drawing Sheets

(51) Int. Cl.
*G06F 1/00* (2006.01)
*G06F 1/32* (2006.01)

(56) References Cited

U.S. PATENT DOCUMENTS

| | | | | |
|---|---|---|---|---|
| 7,721,119 | B2* | 5/2010 | Capps, Jr. | G06F 1/26 713/300 |
| 7,917,785 | B2* | 3/2011 | Jacobowitz | G06F 1/3203 713/320 |
| 8,665,592 | B2* | 3/2014 | Mowry | G06F 1/206 165/104.33 |
| 8,674,510 | B2 | 3/2014 | Law et al. | |
| 8,819,686 | B2* | 8/2014 | Memik | G06F 1/206 718/102 |
| 2008/0282074 | A1* | 11/2008 | Jacobowitz | G06F 1/3203 713/1 |
| 2013/0155081 | A1* | 6/2013 | Khodorkovsky | G06F 1/3206 345/522 |
| 2015/0241946 | A1* | 8/2015 | Allen-Ware | G06F 1/3296 713/320 |

FOREIGN PATENT DOCUMENTS

| | | |
|---|---|---|
| KR | 20060017773 A | 2/2006 |
| KR | 20060034270 A | 4/2006 |
| WO | 2012/058202 A1 | 5/2012 |
| WO | 2013/077972 A1 | 5/2013 |
| WO | 2013/090537 A1 | 6/2013 |

OTHER PUBLICATIONS

Zhou et al., "Thermal-aware task scheduling for 3D multicore processors", IEEE Transactions on Parallel and Distributed Systems, vol. 21, No. 1, pp. 60-71, Jan. 2010.

Meng, et al., "Optimizing energy efficiency of 3-D multicore systems with stacked DRAM under power and thermal constraints", DAC, Jun. 2012, pp. 648-655.

* cited by examiner

- Grid Node
- Voltage Regulator
- Branch Resistor
- Core
- Voltage Zone

FIG. 3
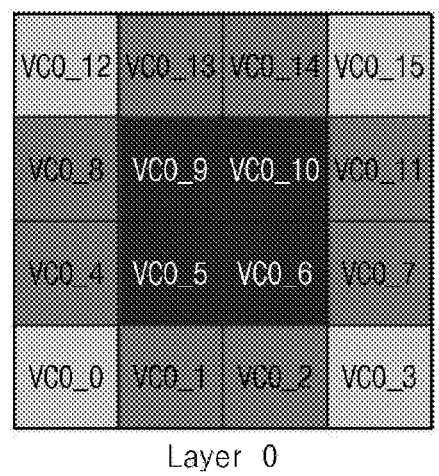
Layer 0
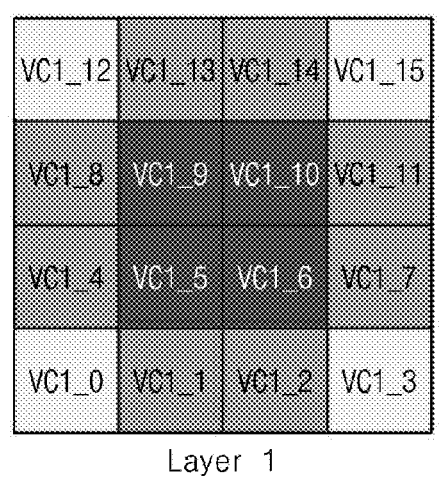
Layer 1

METHOD OF GENERATING VOLTAGE ISLAND FOR 3D MANY-CORE CHIP MULTIPROCESSOR

CROSS-REFERENCE TO RELATED APPLICATIONS

This U.S. non-provisional patent application claims priority under 35 U.S.C. §119 of Korean Patent Application No. 10-2014-0000571, filed on Jan. 3, 2014, the entire contents of which are hereby incorporated by reference.

BACKGROUND OF THE INVENTION

The present invention disclosed herein relates to a method of generating a voltage island for a 3D many-core chip multiprocessor.

In order to successfully apply a 3D stacking technique that has various advantages, power transmission and heat emission worsen due to 3D stacking should be solved. In general, heat generated from a chip is vertically emitted and disappears. However, in a 3D stacking condition, the degree of integration is enhanced, so power consumption increases and heat emission also increases but since generated heat does not easily get out due to a die that is vertically adjacent, heat emission is very important.

Also, in the 3D stacking condition, the number of I/O pins is limited, so power supplied from the outside of a chip to the inside of the chip is also limited but since there is a need to supply more currents to more modules, designing a stable power transmission network is also very important issue.

Since the emission of heat from a circuit is fundamentally determined by power consumption, power management techniques discussed in a 2D integrated circuit (IC) may also be utilized for heat emission management. By generating many voltage islands in one chip, it is possible to operate a part needing high performance at a high voltage and a high frequency and operate a part needing relatively low performance at a low voltage and a low frequency, so decreasing total power consumption. In a multi-core and many-core, several cores are bound to form one voltage island. However, since existing methods address a heat emission issue in a 2D-structure processor, there are difficulties in directly applying them to a 3D condition.

SUMMARY OF THE INVENTION

The present invention provides a method of forming a voltage island that may solve the limitation of heat emission of a 3D many-core chip multiprocessor.

The technical tasks of the present invention are not limited to the above-mentioned technical tasks and other technical tasks not mentioned will be able to be clearly understood by a person skilled in the art from the following descriptions.

Embodiments of the present invention provide methods of forming a voltage island for a 3D many-core chip multiprocessor, the method including setting the priority of a voltage zone based on the heat emission characteristic of the voltage zone; and forming a voltage island by using the priority.

In some embodiments, the setting of the priority of the voltage zone may include analyzing the heat emission characteristic of the voltage zone in consideration of the structure of the 3D many-core.

In other embodiments, the analyzing of the heat emission characteristic of the voltage zone in consideration of the structure of the 3D many-core may be performed in consideration of the distance between the voltage zone and a heat sink; and the distance between the voltage zone and the center of a layer at which the voltage zone is located.

In still other embodiments, the analyzing of the heat emission characteristic of the voltage zone in consideration of the structure of the 3D many-core may include obtaining the difference between the temperature of a voltage zone having the lowest steady state temperature and the temperature of each voltage zone.

In even other embodiments, the forming of the voltage island by using the priority may include setting an initial voltage based on a pre-designated task graph; and arranging the tack on a core.

In yet other embodiments, the arranging of the task on the core may be performed by first arranging tasks operating at a high voltage and then arranging tasks operating at a low voltage.

In further embodiments, the arranging of the task on the core may include arranging a task on any one of voltage zones having the highest priority; and re-adjusting the priority of the voltage zone.

In still further embodiments, the method may further include arranging the next task according to the re-adjusted priority of the voltage zone.

In even further embodiments, the re-adjusting of the priority of the voltage zone may be performed based on the amount of data communicated between voltage zones and the communication distance between the voltage zones.

In yet further embodiments, the re-adjusting of the voltage zone may be performed by Equation below:

$$EP(VC_{l-c}) = \alpha \Delta T_{steady} + \sum_{s=1}^{\infty} CW_s \times D_s$$

(where $VC_{l-c}$ (where means a voltage zone located at the location c on a first layer, $CW_s$ means the amount of data communicated between $VC_{1-c}$ and an already selected voltage zone, and $D_s$ means the shortest communication distance between an already selected voltage zone and $VC_{l-c}$).

In other embodiments of the present invention, recording mediums having thereon programs to perform any one of the methods above are provided.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 3 shows the heat emission characteristic of a 3D many-core that includes two layers each of which has sixteen cores;

DETAILED DESCRIPTION OF PREFERRED EMBODIMENTS

Figure 1:
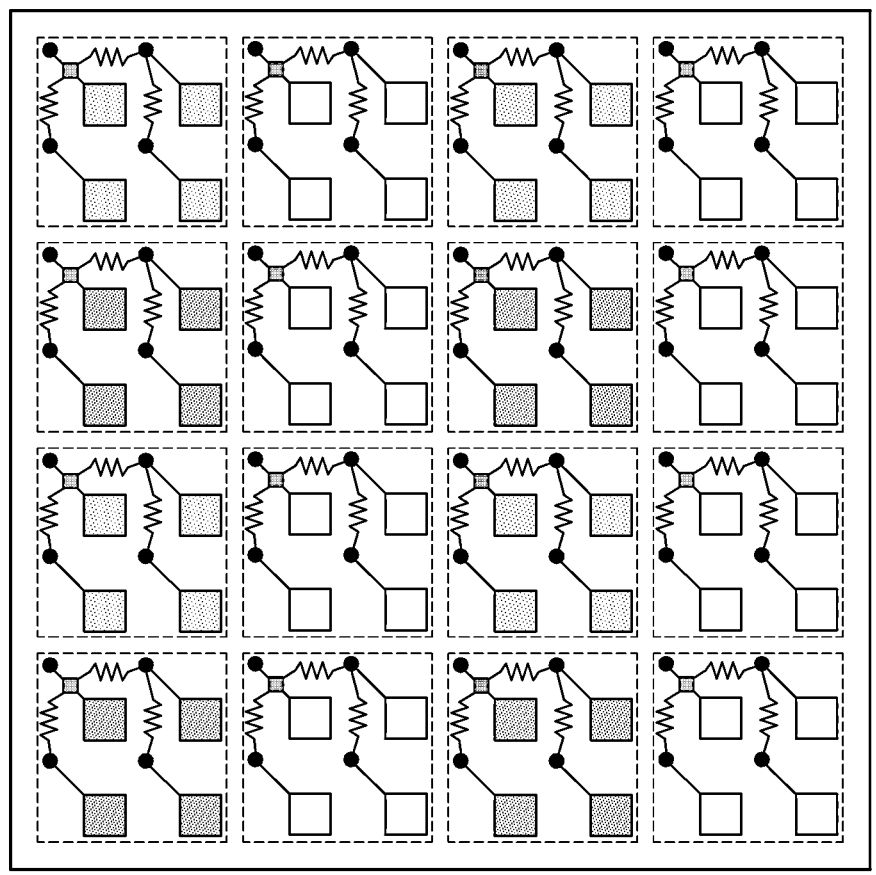
FIG. 1 illustratively represents one layer in a 3D many-core structure in which all layers have the same shape.

Other advantages and features of the present invention, and implementation methods thereof will be clarified through following embodiments described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to a person skilled in the art. Further, the present invention is only defined by scopes of claims.

Even if not defined, all the terms used herein (including technology or science terms) have the same meanings as those generally accepted by typical technologies in the related art to which the present invention pertains. The terms defined in general dictionaries may be construed as having the same meanings as those used in the related art and/or the present disclosure and even when some terms are not clearly defined, they should not be construed as being conceptual or excessively formal.

The terms used herein are only for explaining embodiments while not limiting the present invention. The terms of a singular form may include plural forms unless otherwise specified. The terms used herein "includes", "comprises", "including" and/or "comprising" do not exclude the presence or addition of one or more compositions, ingredients, components, steps, operations and/or elements other than the compositions, ingredients, components, steps, operations and/or elements that are mentioned. In the present disclosure, the term "and/or" indicates each of enumerated components or various combinations thereof.

The term "unit", "device", "block", or "module" used herein may mean a unit for processing at least one function or operation. For example, it may mean software or a hardware component such as FPGA or ASIC. However, the term "unit", "device", "block" or "module" is not limited to the software or the hardware. The term "unit", "device", "block" or "module" may be configured in an addressable storage medium or may be configured to operate one or more processors. Thus, as an example, the "unit", "device", "block" or "module" includes components such as software components, object-oriented software components, class components, and task components; processes, functions, attributes, procedures, sub routines, program code segments, drivers, firmware, micro codes, circuits, data, DBs, data structures, tables, arrays and variables. Components and functions provided in the "unit", "device", "block" or "module" may be integrated as a smaller number of components and a smaller number of units, blocks, or modules or may be further divided into further components and further units, groups, or modules.

If it is possible to design one core as an individual voltage zone to be able to independently control the supply voltages of all cores, it is possible to optimize a given application and thus power consumption but it is practically impossible to design a power transmission network to be able to support it. In particular, using an on-chip voltage regulator in a 3D structure in which power transmission is instable may be needed and, when considering an additional area and power consumption for the voltage regulator, core-based voltage control is impossible. The present invention is provide to solve the above-described limitations and relates to a method of forming a voltage island that decrease the energy consumption of a 3D many-core chip multiprocessor and solve the limitation of heat emission of the 3D many-core chip multiprocessor. According to can embodiment of the present invention, it is possible to form a voltage island by utilizing a heat emission characteristic depending on the location of each core on a 3D many-core chip multiprocessor.

FIG. 1 illustratively represents one layer in a 3D many-core structure in which all layers have the same shape.

As shown in FIG. 1, each layer configuring the 3D many-core includes many voltage zones in which a voltage and a frequency are determined by one voltage regulator. In FIG. 1, four cores having a 2×2 form form one voltage zone but the form of the voltage zone and the number of cores may be changed in consideration of a design cost. One or more of the voltage zones physically fixed may be integrated to form one voltage island.

FIGS. 2 to 5 are diagrams for explaining a method of forming a voltage island according to an embodiment of the present invention.

Figure 2:
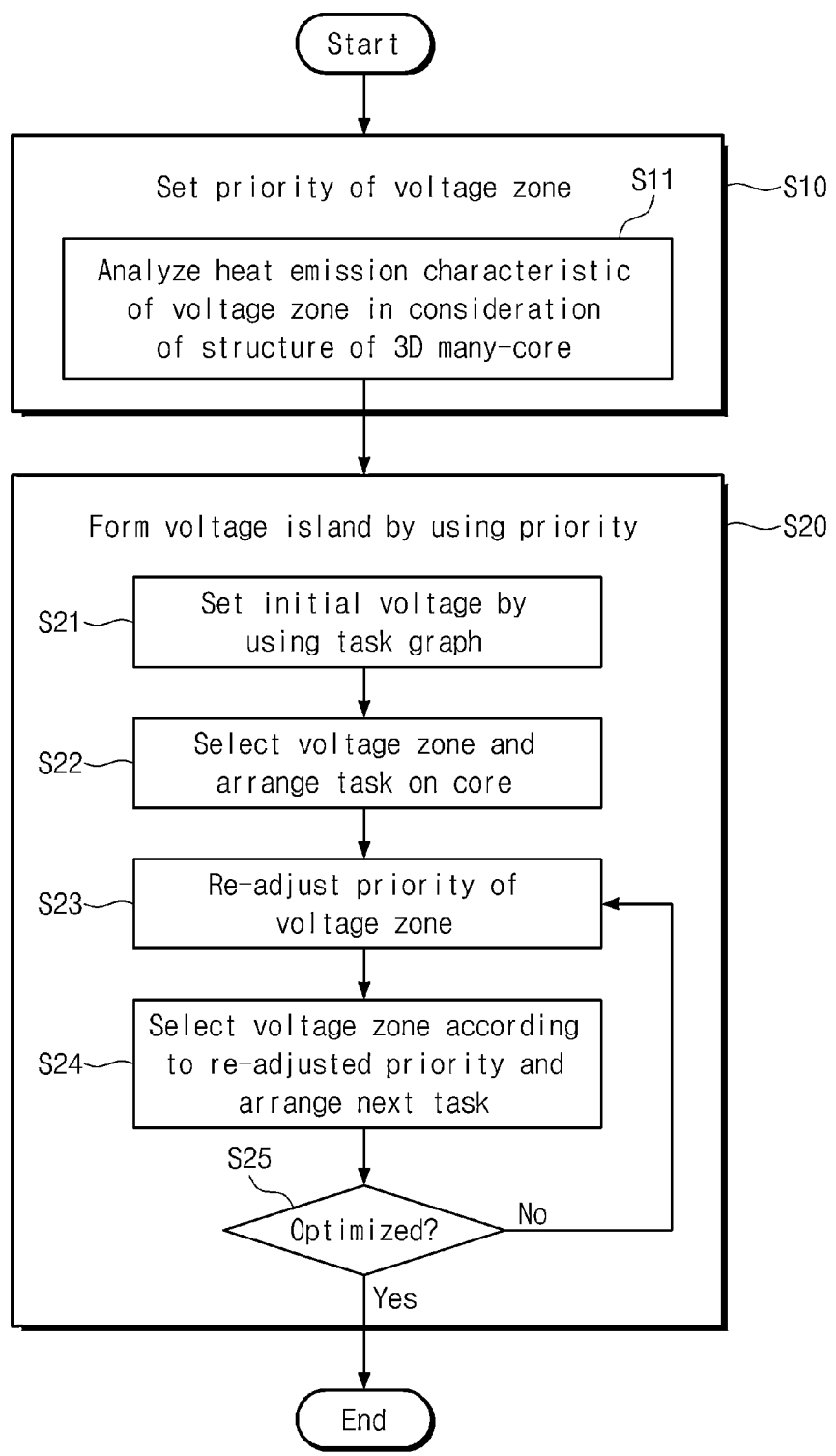
FIG. 2 is a diagram for explaining a method of forming a voltage island according to an embodiment of the present invention.

As shown in FIG. 2, the method of forming the voltage island according to an embodiment of the present invention includes setting the priority of voltage zones in step S10 and forming a voltage island by using the priority in step S20.

Setting the priority of the voltage zones in step S10 may include analyzing the heat emission characteristic of the voltage zones in consideration of the structure of a 3D many-core in step S11.

According to an embodiment, analyzing the heat emission characteristic of the voltage zones is performed by measuring a steady state temperature when performing the same work, and a voltage zone having a low steady state temperature has a higher priority.

According to an embodiment, in step S11 of analyzing the heat emission characteristic of a voltage zone in consideration of the structure of a 3D many-core, it is possible to obtain the difference between a voltage zone having the lowest steady state temperature and each voltage zone. The temperature difference obtained for each voltage zone may be used for forming a voltage island.

According to an embodiment, step S11 of analyzing the heat emission characteristic of a voltage zone in consideration of the structure of a 3D many-core may be performed in consideration of the distance between a corresponding voltage zone and the center of a layer on which a corresponding voltage zone is located. Even in a case where voltage zones are located on the same layer, when a voltage zone arranged on the edge of a layer and a voltage zone arranged at the center of a layer perform the same work and consume the same power, the voltage zone arranged at the center of a layer has a higher temperature than the voltage zone arranged on the edge of a layer because the heat emission of the former is not smooth.

According to an embodiment, step S11 of analyzing the heat emission characteristic of a voltage zone in consideration of the structure of a 3D many-core may be performed in consideration of the distance between a corresponding voltage zone and a heat sink. In the case of a 3D many-core, when a voltage zone located at a layer close to a heat sink that emits heat and a voltage zone located at a layer distant from the heat sink perform the same work and consume the same poser, the voltage zone located at a layer distant from the heat sink has a higher temperature.

Figure 4:
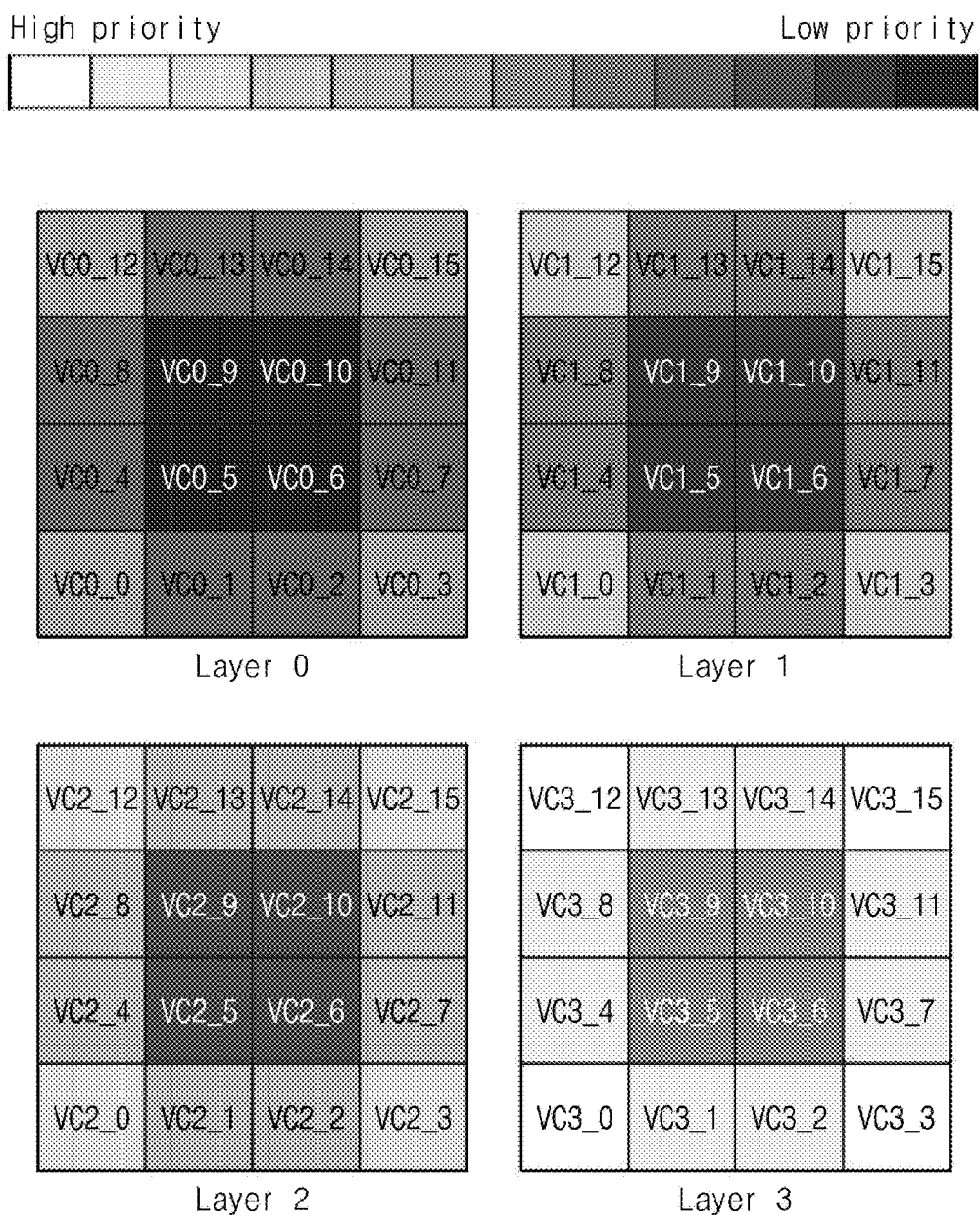
FIG. 4 shows the heat emission characteristic of a 3D many-core that includes four layers each of which has sixteen cores.

FIG. 3 shows the heat emission characteristic of a 3D many-core that includes two layers each of which has sixteen cores, and FIG. 4 shows the heat emission characteristic of a 3D many-core that includes four layers each of which has sixteen cores.

As shown in FIGS. 3 and 4, in the case of cores arranged on the same location of each layer, it may be seen that a lower layer has a lower priority because it is difficult to vertically emit heat. Also, it may be seen that a voltage zone close to the center on the same layer has a lower priority because it is difficult to emit heat from the center of a layer.

Referring back to FIG. 2, step S20 of forming a voltage island by using a priority includes setting an initial voltage by using a task graph in step S21, selecting a voltage zone and arranging a task on a core in step S22, re-adjusting the priority of a voltage zone in step S23, and selecting a voltage zone according to a re-adjusted priority and arranging the next task in step S24. After selecting a voltage zone according to a re-adjusted priority and arranging the next task in step S24, it is checked whether scheduling is optimized, and when the scheduling is not optimized, it is possible to again perform step S23 of re-adjusting the priority of a voltage zone.

Step S21 of setting an initial voltage by using a task graph may be performed by analyzing a given task graph to be able to maximize the utilization of a given slack. Since a task is not actually arranged on a core, the setting of the initial voltage may be performed in consideration of worst routing.

Step S22 of selecting a voltage zone and arranging a task on a core may be performed by first arranging tasks of which the initial voltages are highly set. After the number of voltage zones needed for arranging tasks having a corresponding voltage level is determined, a voltage zone having the highest priority among voltage zones on which tasks are not yet arranged is selected. When there is a need for n voltage zones in order to configure a specific voltage island, it is possible to randomly select n of voltage zones having the highest priority but in some cases, it is possible to increase power consumption by increasing energy consumed in the communication between cores.

Figure 5:
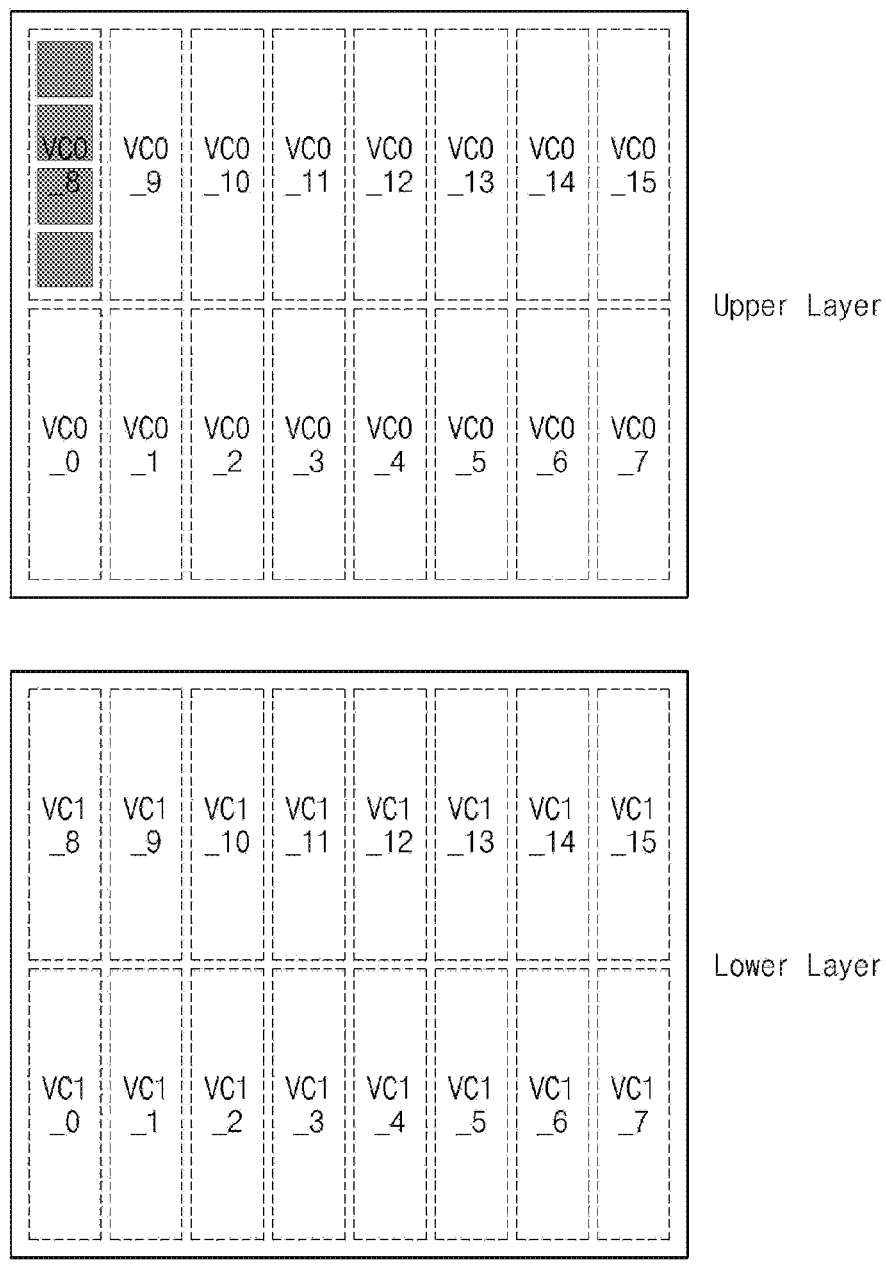
FIG. 5 represents a many-core in which one voltage zone has four cores in a 4×1 form and which includes two layers, a lower layer and an upper layer.

FIG. 5 represents a many-core in which one voltage zone has four cores in a 4×1 form and which includes two layers, a lower layer and an upper layer. In FIG. 5, VC 1_c means a voltage zone located at the location c on a first layer. In a structure as shown in FIG. 5, VC 1_0, VC 1_7, VC 1_8, and VC 1_15 of an upper layer close to a heat sink and easy to emit heat have the highest priority, and VC 0_0, VC 0_7, VC 0_8, and VC 0_15 of a lower layer have the second highest priority. If there is a need for three voltage zones in order to configure a specific voltage island, it is possible to randomly select three of VC 1_0, VC 1_7, VC 1_8, and VC 1_15 having the highest priority. If VC 1_0, VC 1_7, and VC 1_8 are selected, energy consumed in communication increases because VC 1_0 and VC 1_8 are close physically to each other but VC 1_7 is distant from VC 1_0 and VC 1_8. Thus, it may be advantageous to select VC 0_0 or VC 0_7 close to VC 1_0 and VC 1_8 and having a priority one-level-lower than them.

Thus, there is a need for re-adjusting the priority of each voltage zone in order to select an appropriate voltage zone, and step S23 of re-adjusting the priority of a voltage zone may be performed based on the amount of data communicated between voltage zones and a communication distance.

According to an embodiment of the present invention, step S23 of re-adjusting the priority of a voltage zone may be performed by Equation 1 below.

$$EP(VC_{l-c}) = \alpha \Delta T_{steady} + \sum_{s=1}^{\infty} CW_s \times D_s \quad \langle \text{Equation 1} \rangle$$

$VC_{l-c}$ means a voltage zone located at the location c on a first layer, $CW_s$ means the amount of data communicated between $VC_{l-c}$ and an already selected voltage zone, and $D_s$ means the shortest communication distance between an already selected voltage zone and $VC_{l-c}$.

When the priority of a voltage zone is re-adjusted and a voltage zone is selected, step S24 of selecting a voltage zone according to a re-adjusted priority and arranging the next task is performed. An actual task is arranged in a selected voltage zone and routing is determined. In a network on chip (NoC) based 3D many-core chip multiprocessor, routing first performs a vertical (z direction) movement.

After performing step S24 of selecting a voltage zone according to a re-adjusted priority and arranging the next task, power consumed in formed voltage islands is calculated. Since step S21 of setting an initial voltage by using a task graph considers worst routing, optimization S25 may be performed by updating actual routing information to the task graph and checking the presence or absence of a slack.

The method of forming a voltage island according to the embodiment of the present invention as described above may be manufactured as a program to be executed on a computer and may be stored in a computer readable recording medium. The computer readable recording medium includes all kinds of storage devices that store data capable of being read by a computer system. Examples of the computer readable recording medium include a ROM, a RAM, a CD-ROM, a magnetic tape, a floppy disk, and an optical data storage device.

According to an aspect of the present invention, it is possible to solve the problem of heat emission on a 3D many-core chip multiprocessor.

According to an aspect of the present invention, it is possible to stably supply power from a 3D many-core chip multiprocessor.

The effect of the present invention is not limited to those described above, and effects not mentioned will be clearly understood by a person skilled in the art, from the present disclosure and the accompanying drawings.

Since the above embodiments are presented to help the understanding of the present invention, it should be understood that they do not limit the scope of the present invention and various variations thereto also belong to the scope of the present invention. For example, each component shown in the embodiments of the present invention may be separately practiced and on the contrary, separated components may be combined. Thus, the technical protective scope of the present invention should be defined by the technical spirit of the following claims and it should be understood that the technical protective scope of the present invention is not limited to the wording of the claims but actually reaches inventions having equivalent technical values.

What is claimed is:

1. A method of forming a voltage island for a 3D many-core chip multiprocessor, the method comprising:
   setting priority of a voltage zone based on heat emission characteristic of the voltage zone; and
   forming a voltage island by using the priority.

2. The method of claim 1, wherein the setting of the priority of the voltage zone comprises analyzing the heat emission characteristic of the voltage zone in consideration of the structure of the 3D many-core.

3. The method of claim 2, wherein the analyzing of the heat emission characteristic of the voltage zone in consideration of the structure of the 3D many-core is performed in consideration of distance between the voltage zone and a heat sink; and distance between the voltage zone and a center of a layer at which the voltage zone is located.

4. The method of claim 2, wherein the analyzing of the heat emission characteristic of the voltage zone in consideration of the structure of the 3D many-core includes obtaining difference between temperature of a voltage zone having the lowest steady state temperature and temperature of each voltage zone.

5. The method of claim 1, wherein the forming of the voltage island by using the priority comprises:
   setting an initial voltage based on a pre-designated task graph; and
   arranging task on a core.

6. The method of claim 5, wherein the arranging of the task on the core is performed by first arranging tasks operating at a high voltage and then arranging tasks operating at a low voltage.

7. The method of claim 5, wherein the arranging of the task on the core comprises:
   arranging a task on any one of voltage zones having the highest priority; and
   re-adjusting the priority of the voltage zone.

8. The method of claim 7, further comprising arranging the next task according to the re-adjusted priority of the voltage zone.

9. The method of claim 7, wherein the re-adjusting of the priority of the voltage zone is performed based on the amount of data communicated between voltage zones and a communication distance between the voltage zones.

10. The method of claim 9, wherein the re-adjusting of the voltage zone is performed by Equation below:

$$EP(VC_{l-c}) = \alpha \Delta T_{steady} + \sum_{s=1}^{\infty} CW_s \times D_s$$

(where $VC_{l-c}$ means a voltage zone located at the location c on a first layer, $CW_s$ means the amount of data communicated between $VC_{l-c}$ and an already selected voltage zone, and $D_s$ means the shortest communication distance between an already selected voltage zone and $VC_{l-c}$).

11. A non-transitory computer-readable storage medium storing a computer program for operating a computer to execute a method according to claim 1.

* * * * *